(12) United States Patent
Suzuki

(10) Patent No.: US 7,700,209 B2
(45) Date of Patent: Apr. 20, 2010

(54) POWER GENERATION CONTROL SYSTEM FOR FUEL CELL

(75) Inventor: Keisuke Suzuki, Fujisawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1111 days.

(21) Appl. No.: 10/519,472

(22) PCT Filed: Dec. 16, 2003

(86) PCT No.: PCT/JP03/16093

§ 371 (c)(1), (2), (4) Date: Dec. 29, 2004

(87) PCT Pub. No.: WO2004/059767

PCT Pub. Date: Jul. 15, 2004

(65) Prior Publication Data

US 2005/0244688 A1    Nov. 3, 2005

(30) Foreign Application Priority Data

Dec. 25, 2002    (JP)    ............... 2002-374433

(51) Int. Cl.
    *H01M 8/04*    (2006.01)
(52) U.S. Cl. .............. 429/13; 429/22; 429/23; 429/24
(58) Field of Classification Search ............ None
    See application file for complete search history.

(56) References Cited

U.S. PATENT DOCUMENTS 6,428,917 B1    8/2002    Lacy et al.

| 2001/0024746 | A1* | 9/2001 | Ueda et al. ............... 429/22 |
| 2002/0051899 | A1 | 5/2002 | Keskula et al. |
| 2002/0064697 | A1 | 5/2002 | Sugiura et al. |
| 2002/0192519 | A1* | 12/2002 | Fujita et al. ............. 429/23 |
| 2004/0115487 | A1* | 6/2004 | Ichinose et al. ........... 429/9 |

FOREIGN PATENT DOCUMENTS

| EP | 1 209 023 A2 | 5/2002 |
| JP | 60-030062 A | 2/1985 |
| JP | 661-096674 A | 5/1986 |
| JP | 2000-353535 | 12/2000 |
| JP | 2001-338671 A | 12/2001 |
| JP | 2002-231295 A | 8/2002 |
| JP | 2002-260704 A | 9/2002 |

* cited by examiner

*Primary Examiner*—Jonathan Crepeau
*Assistant Examiner*—Tony Chuo
(74) *Attorney, Agent, or Firm*—Foley & Lardner LLP

(57) ABSTRACT

A power generation control system which includes: a fuel cell (201); a target power provider (101) for the fuel cell (201); a operation status monitoring system (102) for monitoring output power from the fuel cell (201), in which the detected output power includes actual output voltage (AV) of the fuel cell (201); and a controller (214). The controller (214) includes: a target current computing unit (104) which calculates a target current (TI) from the target power (TPW) given by the target power provider (101), based on PW-I characteristic obtained from I-V characteristic of the fuel cell (201); and a command output power computing unit (106) which calculates a command output power (CPW) of the fuel cell (201) based on the target current (TI) and the actual output voltage (AV).

16 Claims, 12 Drawing Sheets

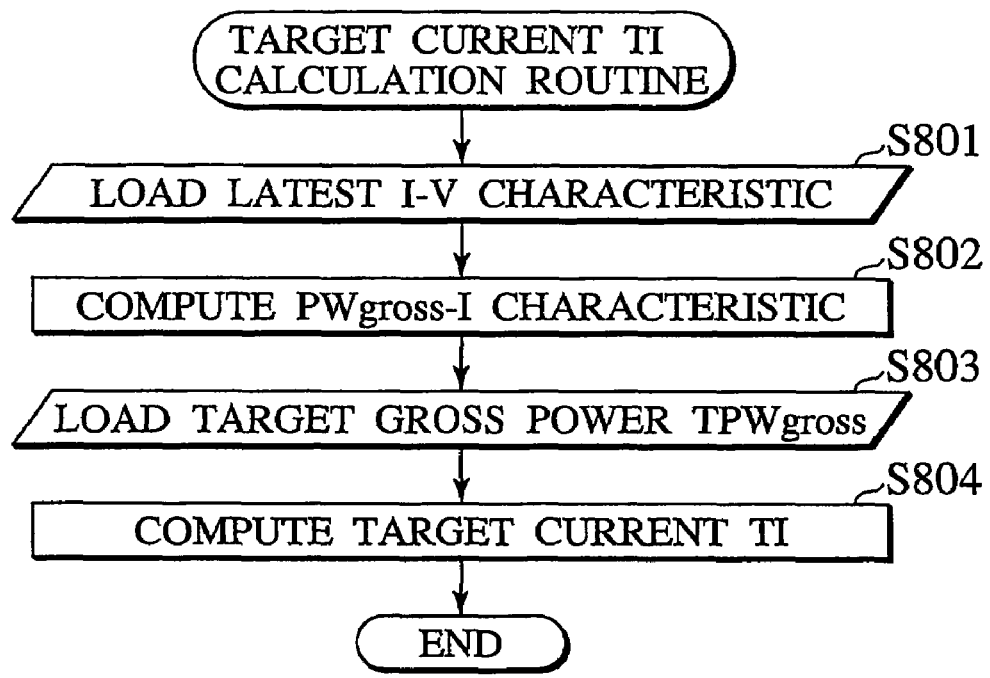
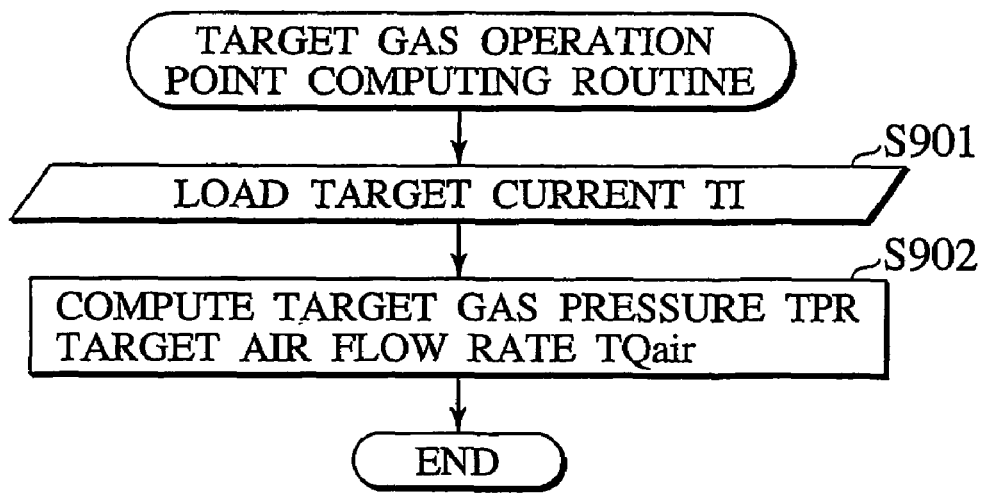

POWER GENERATION CONTROL SYSTEM FOR FUEL CELL

TECHNICAL FIELD

The present invention relates to a power generation control system for a fuel cell, which provides power generation thereof adjusted to the changing output characteristics thereof.

BACKGROUND ART

In a fuel cell system of a fuel-cell vehicle, output of a fuel cell thereof is controlled based on instructions from a vehicle control system.

While the fuel cell system is in warm-up right after the start-up thereof, or due to the deterioration of the system with age, the output characteristics of the fuel cell thereof change to have a lower output voltage. In order to obtain the required output power from the fuel cell at the lower output voltage, an operation point (output current and output voltage) of the fuel cell is shifted to have the output current increased to thereby compensate for shortage of the output power. However, under heavy load conditions at a relatively high output current, the output voltage sharply drops with increasing output current, which further decreases the output power. The system controls to have the output current further increased in order to gain the output power. This brings about a further drop in the output voltage, and consequently in this vicious circle, the required output power cannot be obtained.

Japanese Patent Application Laid-open No. 2002-231295 discloses a power control system in which an output characteristic of the fuel cell is corrected based on actual output current and voltage thereof, and an operation point is adjusted based on the corrected output characteristic.

DISCLOSURE OF INVENTION

In the above control system, however, the operation point of the fuel cell is preset based on the corrected output characteristic. Therefore, if the corrected output characteristic is different from the actual output characteristic thereof, the system may fall into the above-mentioned vicious circle which brings harsh operating conditions to the fuel cell causing accelerated deterioration thereof, failing to obtain the required output power from the fuel cell.

The present invention was made in the light of this problem. An object of the present invention is to provide a power generation control system for a fuel cell, which ensures sufficient output power of the fuel cell and prevents deterioration thereof, coping with the changing output-characteristic thereof.

An aspect of the present invention is a power generation control system comprising: a fuel cell for generating power from fuel gas and oxidant gas fed thereto; a target power provider for providing a target power for the fuel cell; a detector for detecting output power from the fuel cell, the detected output power including actual output voltage of the fuel cell; and a controller comprising a target current computing unit which calculates a target current from the target power based on a power-current characteristic obtained from the output characteristic of the fuel cell, and a command output power computing unit which calculates a command output power of the fuel cell based on the target current and the actual output voltage.

BRIEF DESCRIPTION OF THE DRAWINGS

The invention will now be described with reference to the accompanying drawings wherein:

FIG. 8 is a flowchart showing a process of calculating target current TI according to the second embodiment;

FIG. 9 is a flowchart showing a process of calculating target gas operation point according to the second embodiment;

BEST MODE FOR CARRYING OUT THE INVENTION

Figure 1:
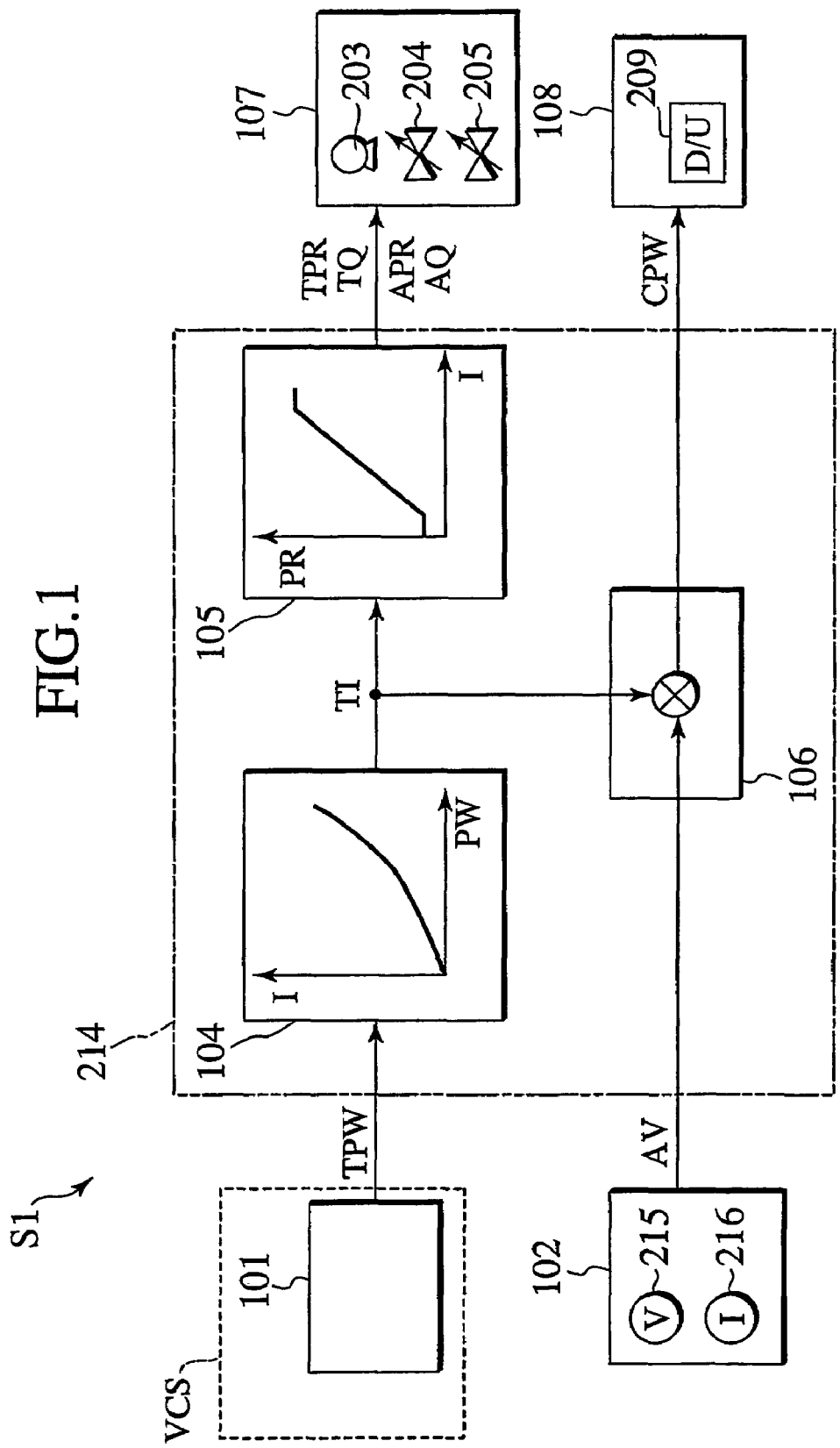
FIG. 1 is a diagram showing a configuration of a power generation control system for a fuel cell according to the first embodiment of the present invention.

Embodiments of the present invention will be explained below with reference to the drawings, wherein like members are designated by like reference characters.

A power generation control system S1 according to the first embodiment shown in FIG. 1 comprises a target power provider 101, an operation status monitoring system 102, a target current computing unit 104, a target gas operation point computing unit 105, an command output power computing unit 106, a gas control system 107, and a power extraction controller 108.

The target power provider 101 calculates a target power TPW to provide the system S1 therewith. In the present control system S1 applied to a fuel-cell vehicle, the target power provider 101 is provided in a vehicle control system VCS, in which the target power TPW is calculated based on the driver's demand and characteristics of the vehicle.

The operation status monitoring system 102 monitors the operation status of the fuel cell by detecting an actual output voltage AV thereof.

The target current computing unit 104 calculates a target current TI from the target power TPW provided by the target power provider 101, based on a power-current characteristic (hereinafter referred to as PW-I characteristic) which can be obtained from a nominal I-V characteristic (i.e., reference I-V characteristic) of the fuel cell.

Based on the target current TI calculated by the target current computing unit 104, the target gas operation point computing unit 105 calculates a target gas pressure TPR and a target gas flow rate TQ at the target operation point of fuel gas and oxidant gas supplied to the fuel cell. Although only the target gas pressure TPR is illustrated in FIG. 1, in the target gas operation point computing unit 105, the target gas flow rate TQ is also included therein.

The command output power computing unit 106 calculates command output power CPW for power generation of the fuel cell, based on the actual output voltage AV detected by the operation status monitoring system 102 and the target current TI calculated by the target current computing unit 104.

The gas control system 107 controls supply of the fuel gas and the oxidant gas to the fuel cell, based on the target gas operation point (the target gas pressure TPR and the target gas flow rate TQ) calculated by the target gas operation point computing unit 105, and an actual gas pressure APR and an actual gas flow rate AQ to be described later.

The power extraction controller 108 controls power extraction from the fuel cell, based on the command output power CPW for power generation thereof calculated by the command output power computing unit 106.

Figure 2:
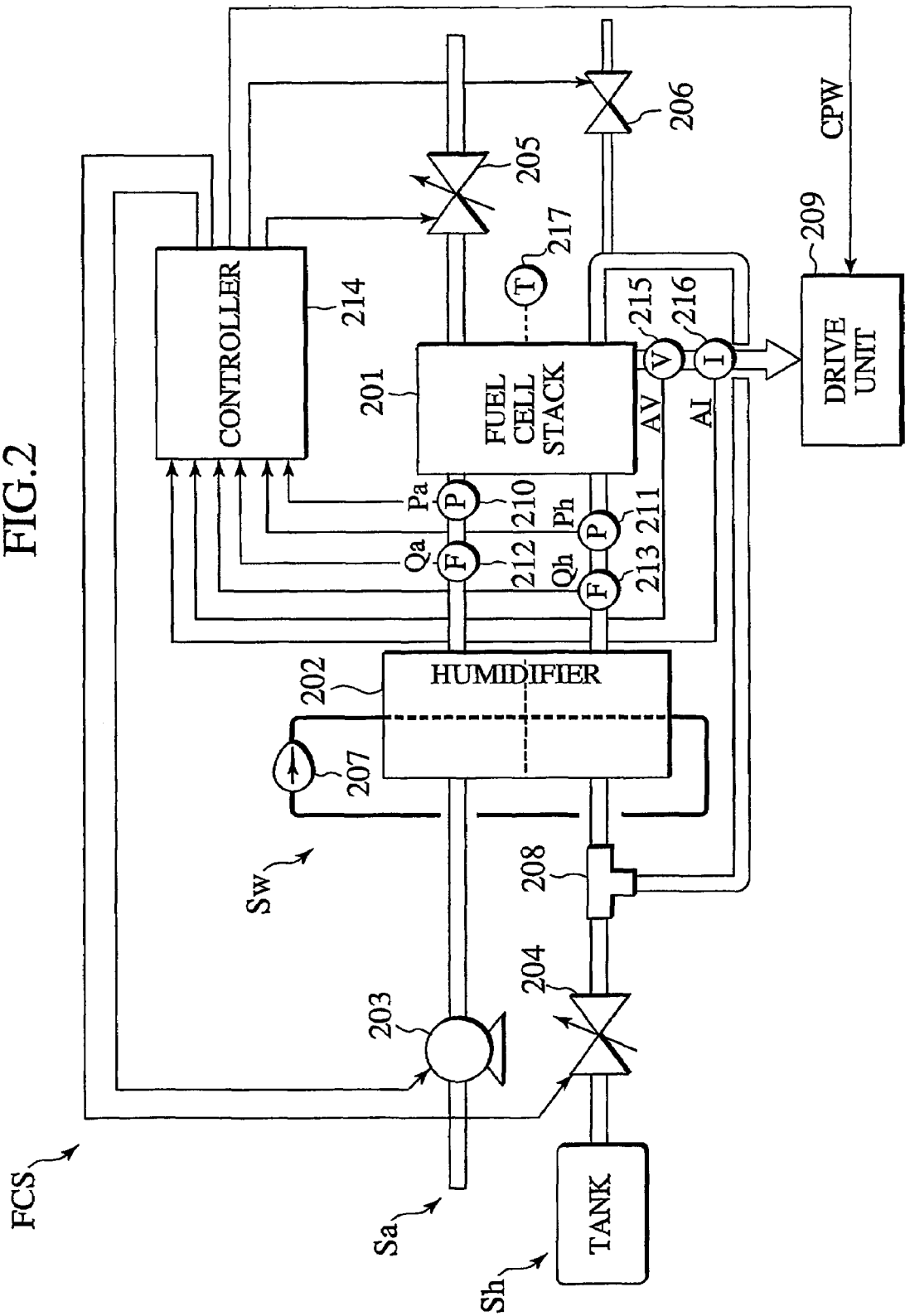
FIG. 2 is a diagram showing a configuration of a fuel cell system that includes the power generation control system of FIG. 1.

FIG. 2 is a diagram showing a configuration of a fuel cell system FCS that includes the power generation control system S1 according to the first embodiment. in FIG. 2, the fuel cell system FCS comprises a fuel cell stack 201, a hydrogen gas feed system Sh which feeds hydrogen gas as fuel gas to the fuel cell stack 201, an air feed system Sa which feeds air as oxidant gas to the fuel cell stack 201, a humidification system Sw which humidifies hydrogen gas and air upstream of the fuel cell stack 201, a drive unit 209 which extracts the power generated by the fuel cell stack 201, and a controller 214.

The humidification system Sw has a humidifier 202, and a deionized water pump 207 which supplies deionized water for humidification to the humidifier 202.

The air feed system Sa comprises a compressor 203 which introduces air to the system, a throttle valve 205 which discharges air from the fuel cell stack 201 to the outside of the system, in which the compressor 203 and throttle valve 205 are operated to control air pressure Pa and air flow rate Qa in the system, an air pressure sensor 210 which detects air pressure Pa at an inlet of the fuel cell stack 201, and an air flowmeter 212 which measures flow rate Qa of air flowing into the fuel cell stack 201.

The hydrogen gas feed system Sh comprises a high-pressure gas tank 204a which stores hydrogen gas therein, a variable throttle regulator 204 which controls flow rate of the hydrogen gas, an ejector 208 which pumps unused hydrogen gas from the fuel cell stack 201 to the upstream thereof for recirculation, a purge valve 206 which discharges hydrogen gas to the outside of the system, a hydrogen gas pressure sensor 211 which detects hydrogen pressure Ph at the inlet of the fuel cell stack 201, and a hydrogen gas flowmeter 213 which measures flow rate Qh of hydrogen gas flowing into the fuel cell stack 201.

On an electrical wiring line from the fuel cell stack 201 to the drive unit 209, a voltmeter 215 and an ammeter 216 are provided, which respectively measure the actual voltage AV and actual current AI of the output power of the fuel cell stack 201.

In the air feed system Sa, the air is introduced into the system and compressed by the compressor 203, and properly humidified through the humidifier 202 to be fed to the fuel cell stack 201. In the hydrogen gas feed system Sh, the hydrogen gas is supplied from the high-pressure tank 204a to the system, at the pressure and flow rate thereof regulated by the regulator 204. The hydrogen gas meets at the ejector 208 with the recirculated hydrogen gas and is properly humidified through the humidifier 202 similarly in the air feed system Sa to be fed to the fuel cell stack 201.

In the fuel cell stack 201, oxygen and hydrogen respectively contained in the air and hydrogen gas fed thereto electrochemically react with each other to generate electric power. Generated power (i.e., current) is supplied to the external system in the vehicle. The air unused for power generation in the fuel cell stack 201 is discharged to the atmosphere via the throttle valve 205. The hydrogen gas from the fuel cell stack 201, which is unused for the power generation, is introduced by the ejector 208 to a supply line upstream of the humidifier 202 to be reused for power generation.

The controller 214 reads the detection values obtained from the air pressure sensor 210, the air flowmeter 212, the hydrogen gas pressure sensor 211, the hydrogen gas flowmeter 213, the voltmeter 215, and the ammeter 216. After reading the detection values from these sensors, the controller 214 determines the target current TI based on the target power TPW, and based on the target current TI, the controller 214 determines target control values for controlling the compressor 203, the throttle valve 205 and the regulator 204. Further, the controller 214 determines an output current to be extracted from the fuel cell stack 201 to the drive unit 209 based on the actual gas pressure and gas flow rate obtained from the above-described sensors, and gives the output current as the command output power CPW to the drive unit 209.

The components of the fuel cell system FCS shown in FIG. 2 and the components of the power generation control system S1 shown in FIG. 1 have the following relationships. The voltmeter 215 corresponds to the operation status monitoring system 102. The controller 214 includes the target current computing unit 104, the target gas operation point computing unit 105, and the command output power computing unit 106. The compressor 203, the regulator 204, and the throttle valve 205 are included in the gas control system 107. The drive unit 209 corresponds to the power extraction controller 108.

Figure 3:
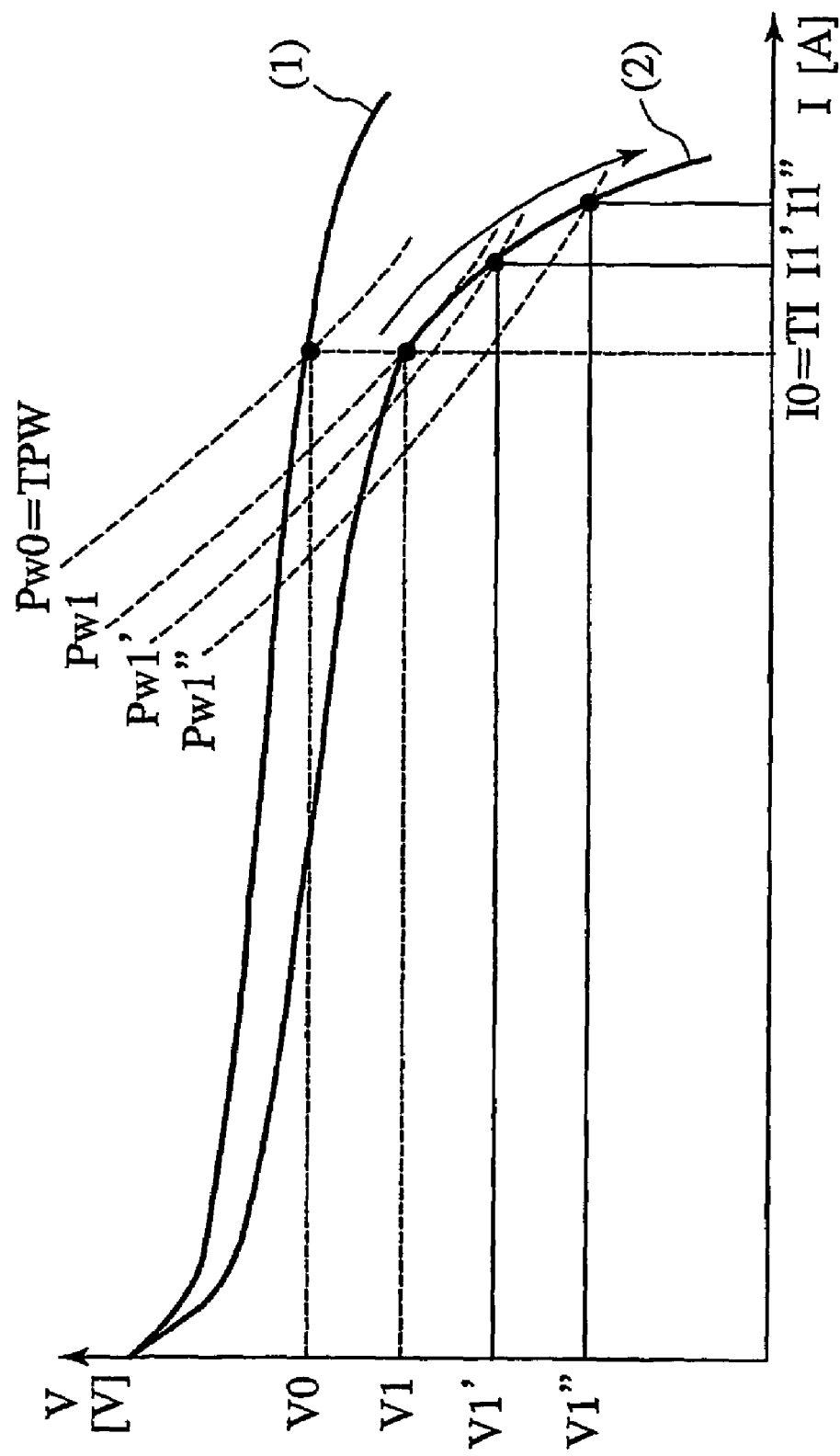
FIG. 3 is a graph showing an output characteristic (i.e., a characteristic curve showing a relationship between output current and output voltage, hereinafter referred to as I-V characteristic) of the fuel cell according to the first embodiment.

FIG. 3 is a graph showing nominal I-V characteristic (1) of a fuel cell in good condition with low operating hours, and I-V characteristic (2) of the fuel cell with the performance thereof degraded due to deterioration with age or insufficient warm-up.

In the case where the target gas operation point is determined based on the target power TPW required from the vehicle control system VCS, and the target power TPW is set as the command output power CPW, the output power extracted from the fuel cell is controlled to be at an output current I0 which is equal to the target current TI, assuming that the performance of the fuel cell exhibits the nominal I-V characteristic. However, the actual I-V characteristic of the fuel cell may deviate from the nominal I-V characteristic (1) and change to the curve (2) due to deterioration with age or insufficient warm-up. The output voltage at the output current I0 drops from V0 to V1, and therefore only a output power PW1 that is smaller than the target power TPW can be extracted from the fuel cell.

As the command output power CPW is set to the target power TPW, the output current is controlled to increase from I0 to I1' in order to have the product of the detected voltage AV and current AI reach the target power TPW. During this period, the target values of the pressure and flow rate of the respective hydrogen gas and air (i.e., the target gas operation point) are set to the values calculated based on the target power TPW (at the current I0) which derives from the nominal I-V characteristic.

However, the I-V characteristic (2) of the fuel cell has a tendency that, in a region of the heavy-load condition at a greater output current near the output current I1, the output voltage sharply drops with increasing output current.

Therefore, if the output current increases from I0 to I1', the output voltage drops from V1 to V1' to provide an output power PW1' lower than PW1. Accordingly, the target power TPW cannot be extracted from the fuel cell. While the system further controls to increase the output current from I1' to I1", the voltage sharply drops from V1' to V1", as can be seen from the I-V characteristic (2). As a result, the output power further decreases to PW1" that is lower than PW1', and the desired target power TPW cannot be extracted. Moreover, the extraction of such an excess current has a risk of affecting a polymer electrolyte film of the fuel cell.

On the other hand, according to the first embodiment, when the vehicle control system VCS requires the target power TPW, the target current computing unit 104 calculates the target current TI based on the nominal I-V characteristic of the fuel cell. Then, the command output power computing unit 106 calculates the command output power CPW from a product (TI×AV) of the target current TI and the actual voltage AV of the fuel cell stack 201.

With the above configuration, when the output current I0 equal to the target current TI is extracted from the fuel cell, the command output power CPW is set to the power PW1 that is equal to the product (TI×AV) of the target current TI and the actual voltage AV. Therefore, the operation point of the fuel cell lies on the I-V characteristic (2). This prevents the unlimited increase of the output current from I0 to I1' and from I1' to I1" for extraction of the target power TPW, thus protecting the polymer electrolyte film of the fuel cell from excess current extraction.

As explained above, according to the first embodiment, the command output power CPW is based on the product of the target current TI calculated from the target power TPW and the actual voltage AV of the fuel cell. Therefore, even if the I-V characteristic of the fuel cell changes due to deterioration with age or insufficient warm-up, adjustment of the command output power CPW can follow the changing actual I-V characteristic. Accordingly, even if the actual output power does not reach the target power TPW, the system does not fall in a vicious cycle, in which increase of the output current for compensating for shortage of the output power leads to the output voltage drop, further lowering the output power. Consequently, the actual output power of the fuel cell follows the command output power CPW for power generation thereof, whereby the deterioration thereof can be prevented.

Figure 4:
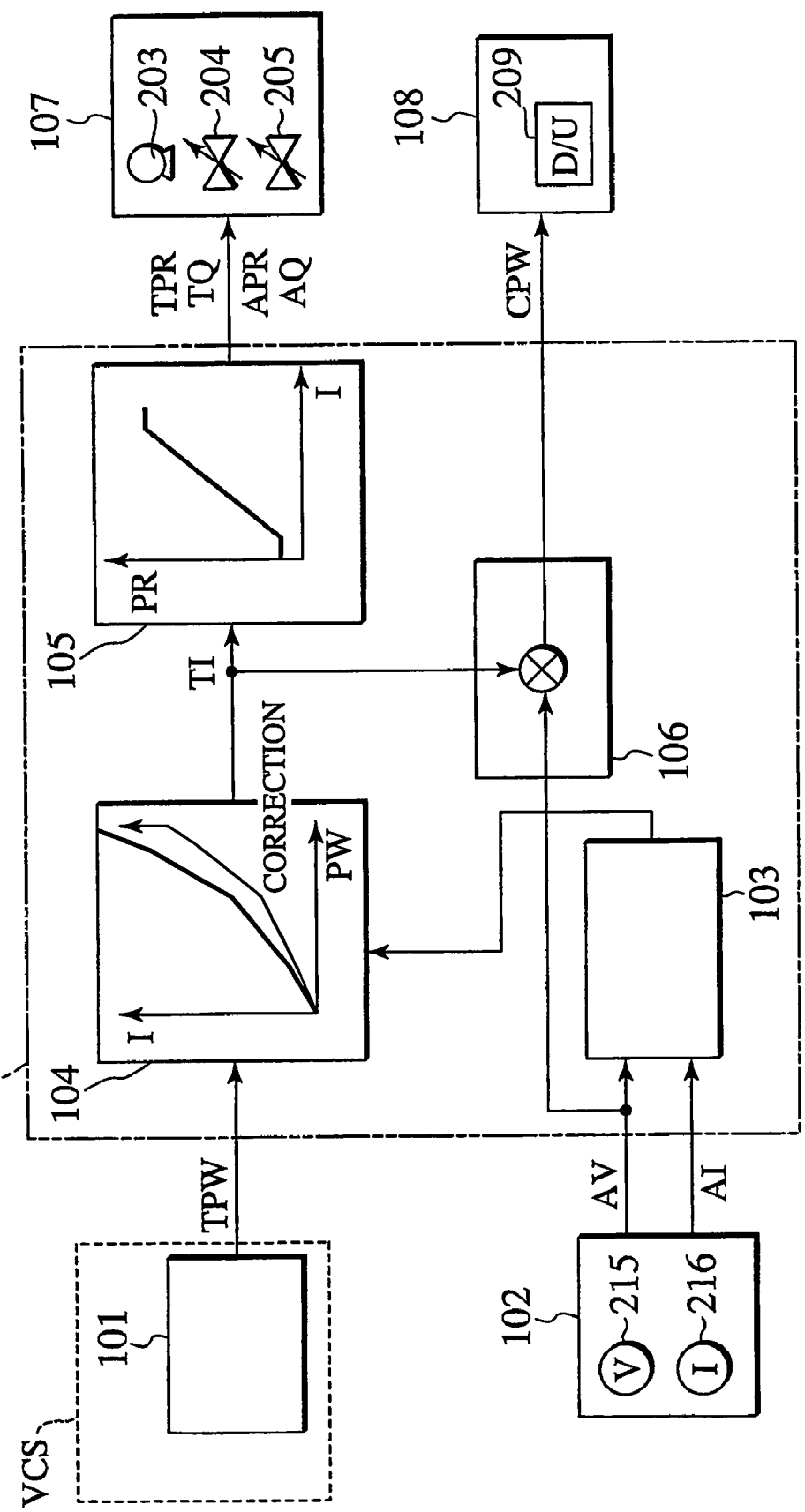
FIG. 4 is a diagram showing a configuration of a power generation control system for a fuel cell according to the second embodiment of the present invention.

FIG. 4 is a diagram showing a configuration of a power generation control system S2 for a fuel cell according to the second embodiment of the present invention. The power generation control system S2 includes an I-V characteristic learning unit 103 in addition to the components of the power generation control system S1 shown in FIG. 1.

The operation status monitoring system 102 detects the actual output current AI of the fuel cell in addition to the actual output voltage AV thereof for monitoring the operation status of the fuel cell.

The I-V characteristic learning unit 103 learns the actual I-V characteristic of the fuel cell from the actual voltage AV and the actual current AI thereof detected by the operation status monitoring system 102, and corrects the I-V characteristic thereof. The learned and corrected I-V characteristic is given to the target current computing unit 104.

The target current computing unit 104 obtains the PW-I characteristic based on the I-V characteristic given from the I-V characteristic learning unit 103, and calculates the target current TI based on the PW-I characteristic.

Configurations of other components are similar to those shown in FIG. 1. Corresponding relationships between the components of the power generation control system S2 for a fuel cell shown in FIG. 4 and the components of the fuel cell system FCS shown in FIG. 2 are similar to those explained in the first embodiment. In other words, the voltmeter 215 and the ammeter 216 are included in the operation status monitoring system 102. The controller 214 includes the I-V characteristic learning unit 103, the target current computing unit 104, the target gas operation point computing unit 105, and the command output power computing unit 106. The compressor 203, the regulator 204, and the throttle valve 205 are included in the gas control system 107. The drive unit 209 corresponds to the power extraction controller 108.

The control process performed in the power generation control system S2 of the second embodiment will be explained with reference to FIG. 5 to FIG. 9.

Figure 5:
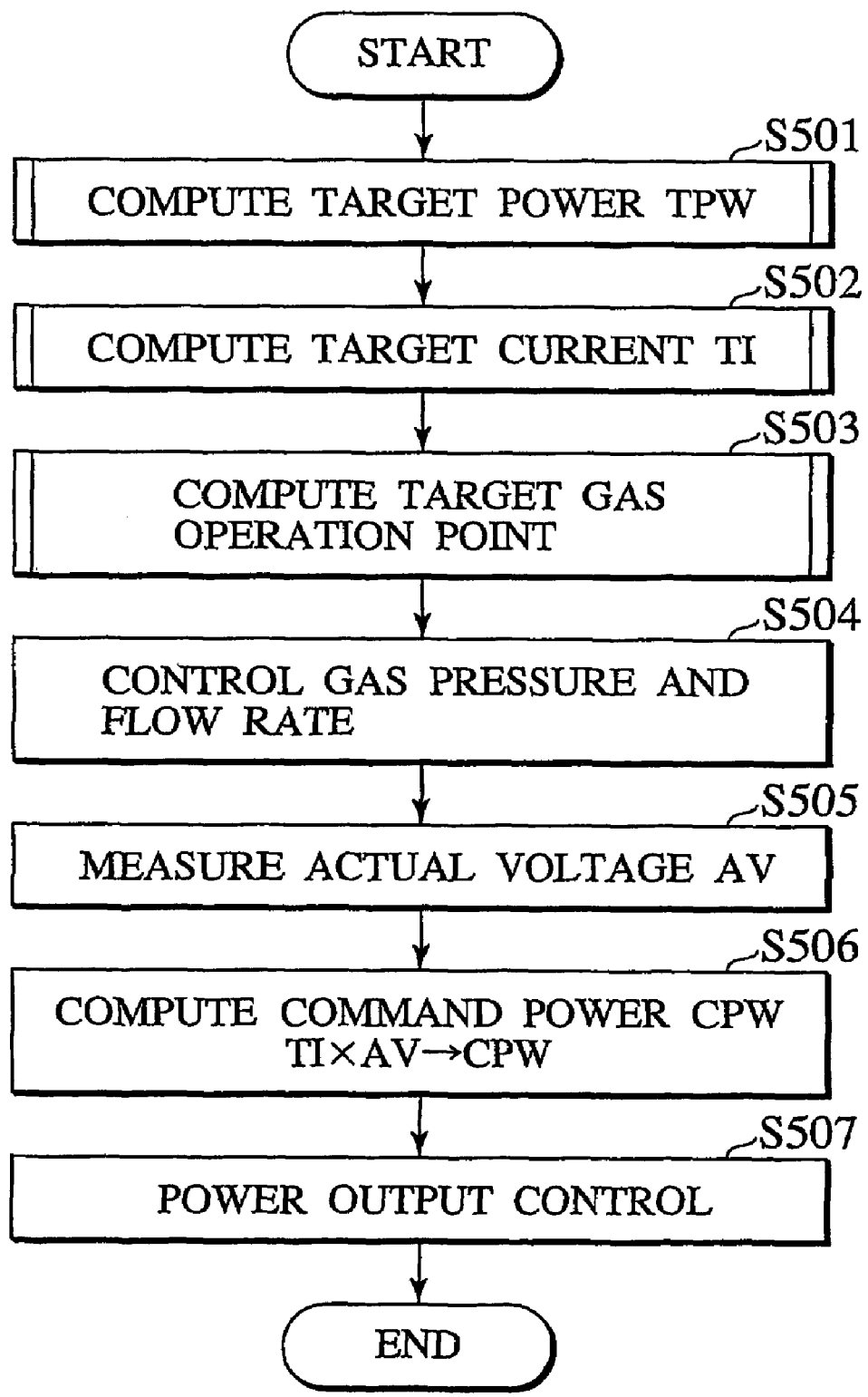
FIG. 5 is a flowchart showing a process of controlling power generation of the fuel cell according to the second embodiment.

FIG. 5 is a flowchart showing a process of controlling power generation extracted from the fuel cell.

At step S501, the target power TPW is calculated. At step S502, the target current TI is calculated from the calculated target power TPW based on the PW-I characteristic which can be obtained from the nominal I-V characteristic. At step S503, the target operation points (i.e., the target gas pressures TPR, and the target gas flow rates TQ) of the respective fuel gas and oxidant gas supplied to the fuel cell are calculated based on the target current TI. At step S504, the supply pressure and flow rate of the fuel gas and the oxidant gas to the fuel cell are controlled based on the calculated target gas operation point, the actual gas pressures APR, and the actual gas flow rates AQ thereof. At step S505, the actual voltage AV of the fuel cell stack 201 is measured. At step S506, the target current TI and the actual voltage AV are multiplied together to obtain the command output power CPW (=TI×AV). At step S507, the output power of the fuel cell is controlled based on the calculated command output power CPW. The above process is executed at every predetermined period (for example, at every 10 ms).

Figure 6:
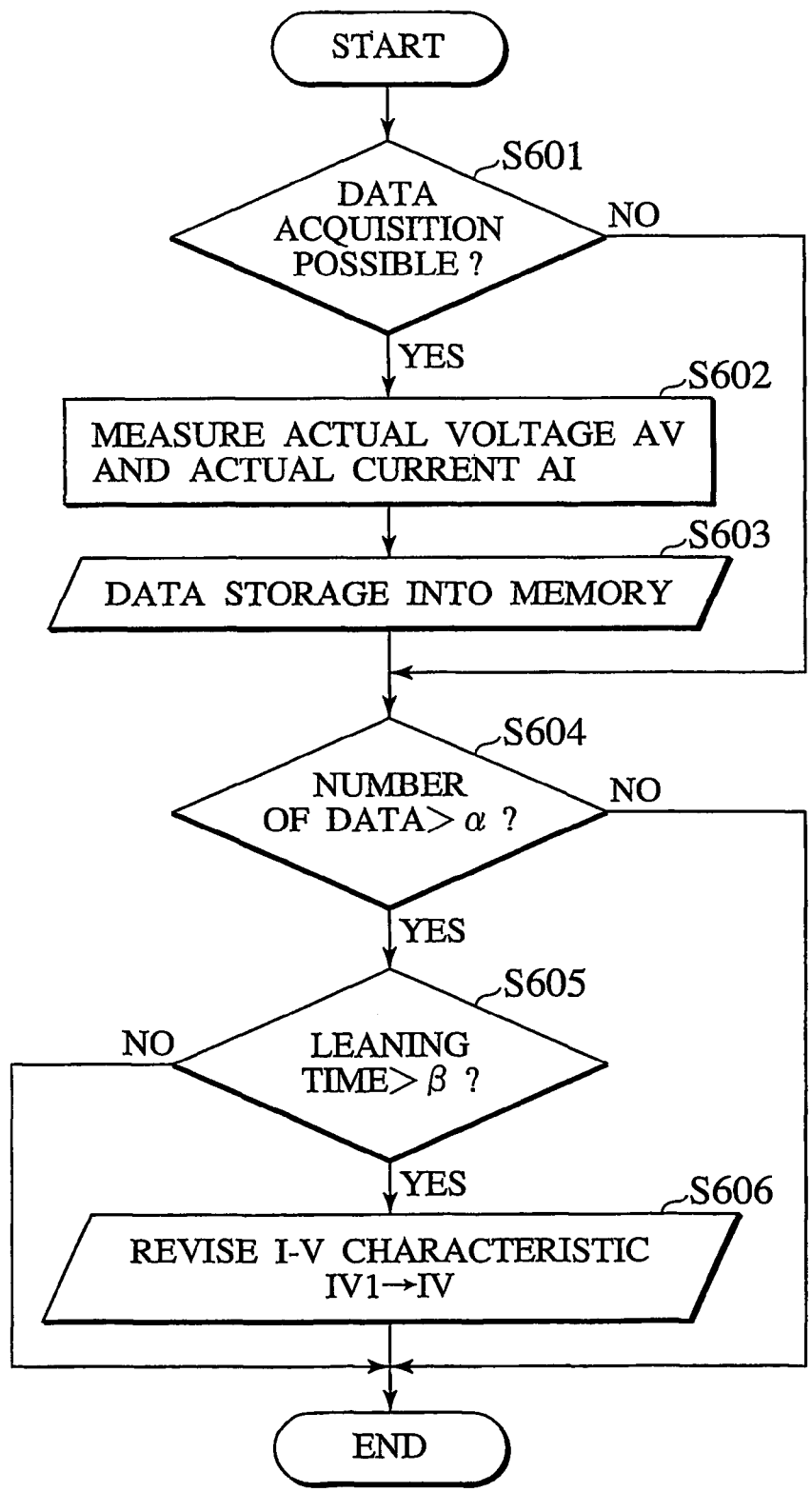
FIG. 6 is a flowchart showing a learning process of the I-V characteristic of the fuel cell according to the second embodiment.

FIG. 6 is a flowchart showing a learning process of the I-V characteristic of the fuel cell. The process shown in FIG. 6 is executed at every predetermined period (for example, at every 10 ms) similar to the process shown in FIG. 5.

At step S601, it is determined whether data of the actual voltage AV and the actual current AI of the fuel cell stack 201 is readable (that is, whether the operation of the fuel cell is not in a transient state where the operational data thereof fluctuate too widely to acquire). When it is determined that the data is readable, the process proceeds to step S602. When it is determined that the data is not readable, the process proceeds to step S604. At step S602, the actual voltage AV and the actual current AI of the fuel cell stack 201 are measured. At step S603, the values measured at step S602 are stored into the memory.

At step S604, it is determined whether the number of data stored at step S603 exceeds a predetermined number α (for example, 5000). When the number exceeds the predetermined number α, the process proceeds to step S605. When the number does not exceed the predetermined number α, this operation routine ends. At step S605, it is determined whether the elapsed time from a start of the data collection or the learning time exceeds a predetermined time β (for example, three hours). When it is determined that the learning time exceeds the predetermined time β, the process proceeds to step S606. On the other hand, when it is determined that the learning time does not exceed the predetermined time β, the operation routine ends. Lastly, at step S606, the collected and stored actual voltages AV and actual currents AI are respectively averaged to obtain learning data IV1. This learning data IV1 is stored into a predetermined memory variable as data IV that represents the current actual I-V characteristic, and the operation ends.

Figure 7:
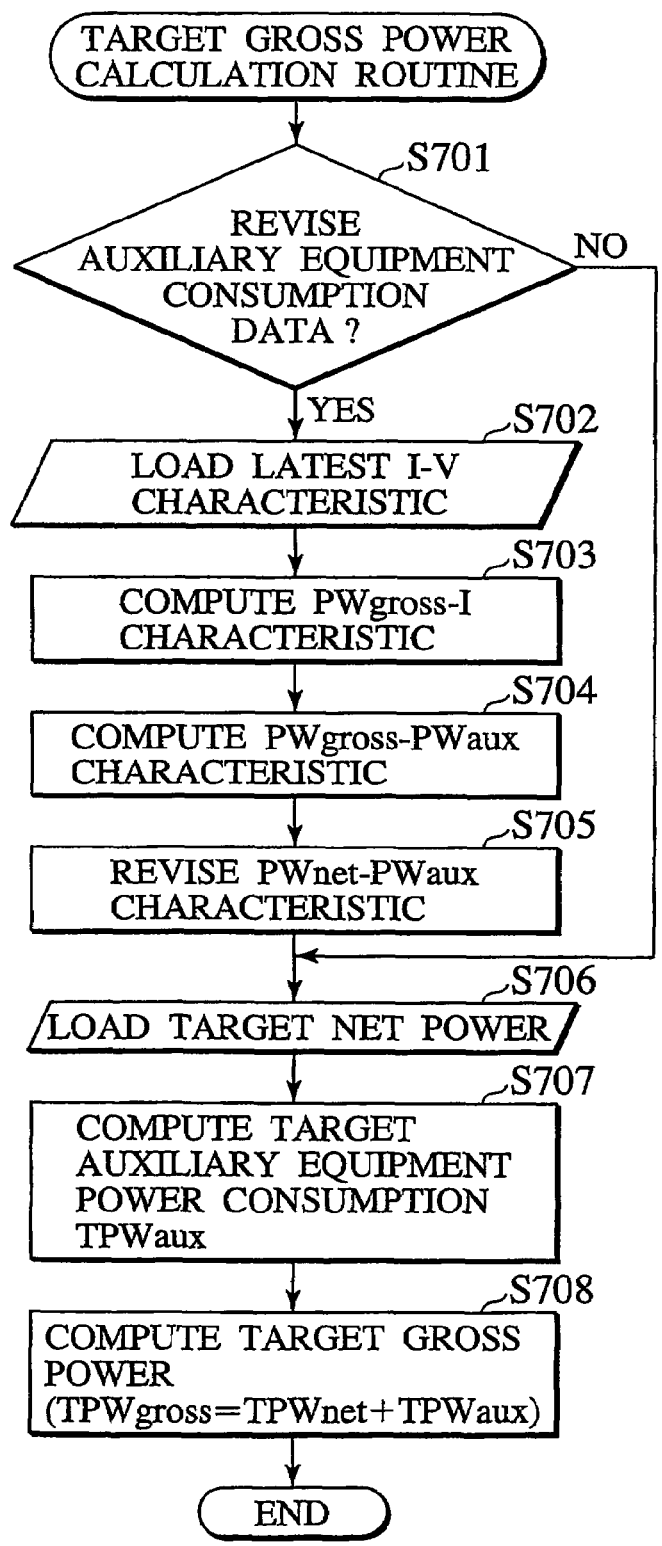
FIG. 7 is a flowchart showing a process of calculating target power TPW [W] according to the second embodiment.

FIG. 7 is a flowchart showing a process of calculating the target power TPW at step S501 shown in FIG. 5.

At step S701, it is determined whether power consumption data of auxiliary equipment for power generation of the fuel cell system FCS is to be updated, wherein, when the I-V characteristic is updated, the auxiliary equipment consumption data is updated. When it is determined at step S701 that the auxiliary equipment consumption data is updated, the process proceeds to step S702. On the other hand, when it is determined at step S701 that the auxiliary equipment consumption data is not updated, the process proceeds to step S706.

At step S702, the latest I-V characteristic is read. At step S703, a gross power Pwgross is calculated as the product of the output current and the output voltage at a point on the read latest I-V characteristic curve, and PWgross-I characteristic is created, which represent relationship between the gross power PWgross and the output current. At step S704, auxiliary equipment power consumption PWaux for various currents are first calculated from the gas pressures and gas flow rates (i.e., the operation point) of the fuel gas and oxidant gas required for generating predetermined currents, and PWgross-PWaux characteristic is created, which represent a relationship between the auxiliary equipment power consumption PWaux and the gross power PWgross. At step S705, net power PWnet is obtained by subtracting the auxiliary equipment power consumption PWaux from the gross power Pwgross (PWnet=PWgross−PWaux) at a point on the PWgross−PWaux characteristic curve, and PWnet−PWaux characteristic is created, which represent a relationship between the net power PWnet and the auxiliary equipment power consumption PWaux. Then, the data stored in the memory is updated according to the created PWnet−PWaux characteristic.

At step S706, target net power TPWnet that is required from the vehicle control system VCS is read. At step S707, target auxiliary equipment power consumption TPWaux is calculated from the target net power TPWnet based on the PWnet-PWaux characteristic updated at step S705. Lastly, at step S708, the target net power TPWnet and the target auxiliary equipment power consumption TPWaux are added to obtain target gross poer TPWgross (=TPWnet+TPWaux), and the routine ends.

FIG. 8 is a flowchart showing a process of calculating the target current TI at step S502 shown in FIG. 5.

At step S801, the learned latest I-V characteristic is read. At step S802, gross power PWgross is calculated as the product of the output current and the output voltage at a point on the read latest I-V characteristic curve, and PWgross-I characteristic is computed, which represent a relationship between the gross power PWgross and the output current. At step S803, the target gross poer TPWgross is read. At step S804, the target current TI is calculated from the target gross poer TPWgross based on the PWgross-I characteristic, and the routine ends.

FIG. 9 is a flowchart showing a process of calculating the target gas operation point at step S503 shown in FIG. 5.

At step S901, the target current TI obtained in the processing at step S502 shown in FIG. 5 is read. At step S902, the target gas pressure TPR and a target air flow rate TQair are calculated from the target current TI based on gas operation point calculation data prepared in advance, and the routine ends.

In the first embodiment according to the present invention, the increase in the output current in a vicious cycle from I0 to I1' and from I1' to I1'' can be prevented, since the product of the target current TI and the actual voltage AV is set as the command output power CPW. However, in such a case, only the actual power PW1 that is smaller than the requested target power TPW can be extracted from the fuel cell.

In the second embodiment, the actual I-V characteristic changing due to the insufficient warm-up or deterioration with age is learned through measurement of the actual voltage AV and the actual current AI of the fuel cell. The PW-I characteristic is computed based on the learned I-V characteristic, and based on the PW-I characteristic, the target current TI is obtained from the target power TPW given from the vehicle control system VCS. In other words, the I-V characteristic as the basis for obtaining the target current TI is different between the first and second embodiments, resulting in the different target currents TI calculated from the same target power TPW.

Figure 10:
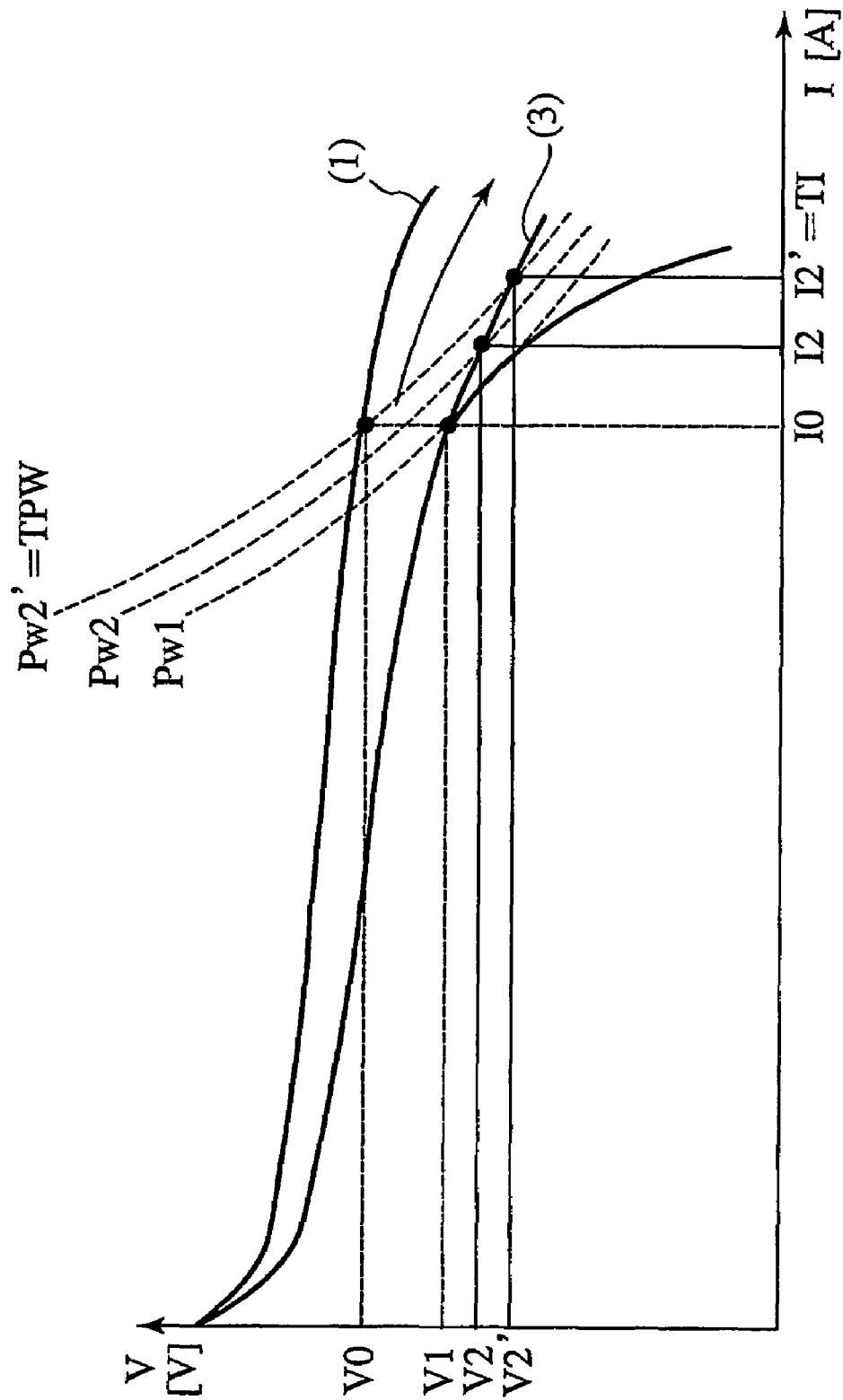
FIG. 10 is a graph showing the I-V characteristic of the fuel cell according to the second embodiment.

For example, if I-V characteristic of the fuel cell is learned to be as the curve of the I-V characteristic (3) shown in FIG. 10, an output current I2' at a point thereon achieving the required target power TPW, which is a intersection between the curve of the I-V characteristic (3) and a curve representing the generated power of PW2', is determined as the target current TI. This output current I2' is greater than the output current I0 of the operation point of the fuel cell according to the first embodiment. Therefore, the target gas operation point is controlled and shifted based on the current I2' to have greater target gas pressure TPR and target gas flow rate TQ thereof than the values obtained based on the current I0. Accordingly, regarding the I-V characteristic (3), a sharp voltage drop under the heavy load condition is prevented.

The command output power CPW is then obtained as the product of the current I2' and the voltage V2' which is the actual output voltage AV, whereby the actual output power of the fuel cell becomes substantially equal to the required target power TPW.

As explained above, in the second embodiment, even when the I-V characteristic of the fuel cell changes due to deterioration with age or insufficient warm-up, the excess current extraction in the vicious cycle can be prevented, and the output power can be substantially equal to the target power. These effects are obtained in addition to those obtained from the first embodiment.

Further, the actual current AI and the actual voltage AV are monitored during the operation of the fuel cell with data of which are continuously collected. The actual I-V characteristic of the fuel cell is thus learned and corrected based on the collected actual current AI and actual voltage AV, whereby precise system control can be achieved.

Further, the target power TPW is calculated, taking into account the power consumed by the auxiliary equipment associated with the system power generation. The power consumption characteristic of the auxiliary equipment (i.e., the auxiliary equipment consumption data) is also corrected when the I-V characteristic and the PW-I characteristic are corrected through the learning process. Therefore, even when the power consumption of the auxiliary equipment changes due to the correction of the I-V characteristic and the PW-I characteristic, desired target power TPW can be achieved.

Figure 11:
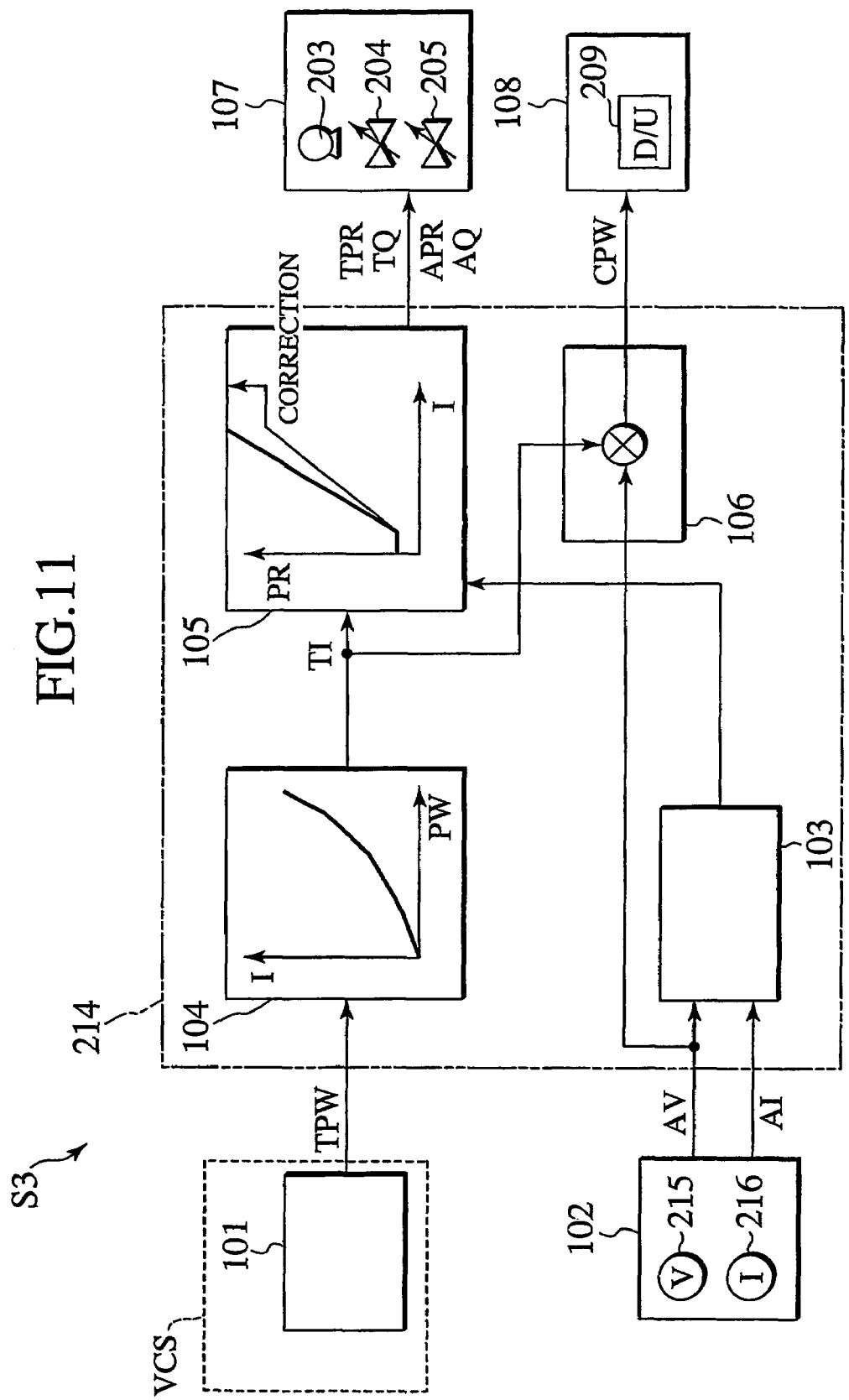
FIG. 11 is a diagram showing a configuration of a power generation control system for a fuel cell according to the third embodiment of the present invention.

FIG. 11 is a diagram showing a configuration of the power generation control system S3 for a fuel cell according to the third embodiment of the present invention. The target current computing unit 104 in the second embodiment obtains the PW-I characteristic based on the I-V characteristic learned and corrected by the I-V characteristic learning unit 103. In the third embodiment, the target gas operation point computing unit 105 calculates the target gas operation point based on the I-V characteristic learned and corrected by the I-V characteristic learning unit 103. The target current computing unit 104 has a configuration similar to that in the first embodiment.

The target gas operation point computing unit 105 calculates the target gas operation point (i.e., the target gas pressure TPR, and the target gas flow rate TQ) based on the target current TI obtained by the target current computing unit 104 and the I-V characteristic learned and corrected by the I-V characteristic learning unit 103.

Configurations of other components are similar to those shown in FIG. 1 and FIG. 2. Relationships between the components of the power generation control system S3 for a fuel cell shown in FIG. 11 and the components of the fuel cell system FCS shown in FIG. 2 are similar to those explained in the first and the second embodiments. In other words, the voltmeter 215 and the ammeter 216 are included in the operation status monitoring system 102. The controller 214 includes the I-V characteristic learning unit 103, the target current computing unit 104, the target gas operation point computing unit 105, and the command output power computing unit 106. The compressor 203, the regulator 204, and the throttle valve 205 are included in the gas control system 107. The drive unit 209 corresponds to the power extraction controller 108.

The control process performed in the power generation control system S3 of the third embodiment will be explained with reference to FIG. 12 to FIG. 13. The process of the output power extraction from the fuel cell, the process of learning the I-V characteristic thereof, and the process of calculating the target power TPW are similar to those shown in the respective flowcharts of FIG. 5, FIG. 6, and FIG. 7. Explanations thereof are therefore omitted.

Figure 12:
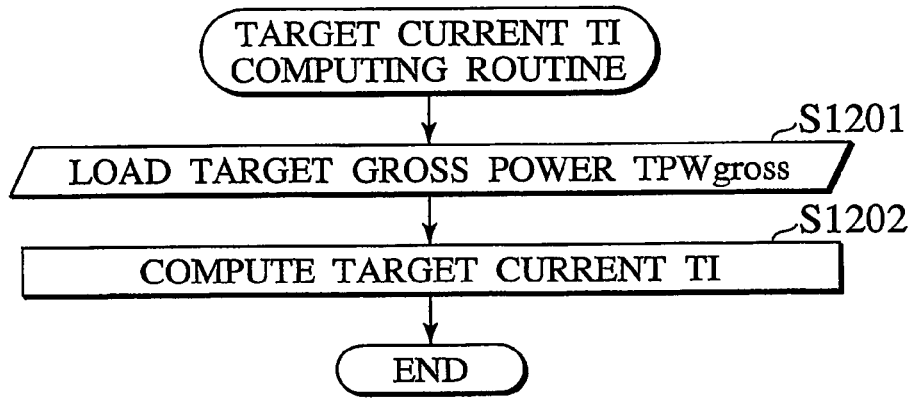
FIG. 12 is a flowchart showing a process of calculating target current TI according to the third embodiment.

FIG. 12 is a flowchart showing the process of calculating the target current TI at step S502 shown in FIG. 5.

At step S1201, the target gross power TPWgross is read. At step S1202, the target current TI is calculated from the target gross power TPWgross based on the TPWgross-I characteristic prepared in advance, then the routine ends.

Figure 13:
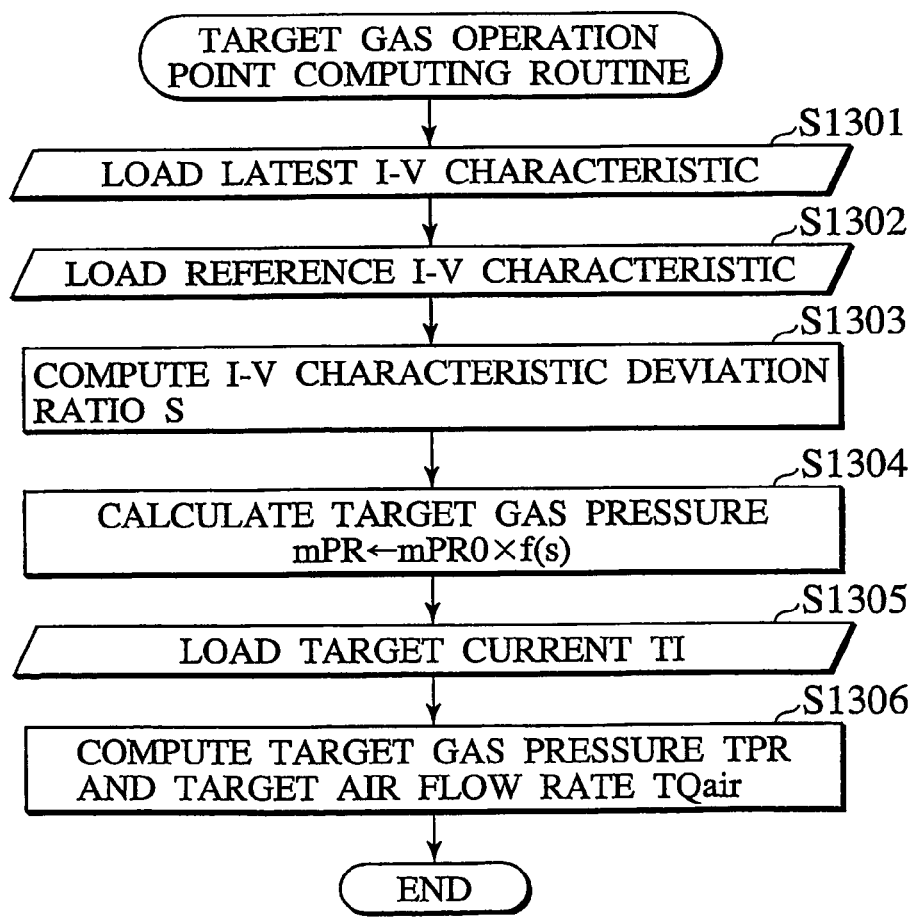
FIG. 13 is a flowchart showing a process of calculating target gas operation point according to the third embodiment.

FIG. 13 is a flowchart showing a process of calculating the target gas operation point at step S503 shown in FIG. 5.

In FIG. 13, at step S1301, the latest I-V characteristic learned and corrected by the I-V characteristic learning unit 103 is read. At step S1302, the reference I-V characteristic equivalent to the nominal I-V characteristic shown in FIG. 3 and FIG. 10 are read. At step S1303, an I-V characteristic deviation ratio S which represents how much the latest I-V characteristic deviates from the reference I-V characteristic is calculated, for example, as follows:

$$S(i) = IV(i)/IVleaned(i),$$

$$S = \Sigma S(i)/N,$$

wherein i represents an integer from 1 to N, IV(i) represents data at each of N points on the reference I-V characteristic curve, and IVlearned(i) represents data at each of N points on the learned I-V characteristic curve at the same current values as those of the N points of IV(i) on the reference I-V characteristic curve. S(i)s are thus calculated for N points in the I-V characteristic. The deviation ratio S is then calculated as an average of N S(i)s.

At step S1304, based on the calculated deviation ratio S and reference target gas pressure data mPR0, a target gas pressure mPR is corrected as the product of the target gas pressure data mPR0 and f(S) (mPR=mPR0×f(S)).

The f(S) represents a predetermined monotone increasing function which returns a positive value for the given deviation ratio S. Instead of the function f(S), table data may be used, in which positive numbers are provided for each of various possible deviation ratios S.

At step S1305, the target current TI obtained by calculation at step S1202 shown in FIG. 12 is read. Lastly, at step S1306, the target gas pressure TPR is calculated based on the target gas pressure mPR obtained at step S1304. The target air flow rate TQair is calculated from predetermined data prepared in advance, and the routine ends.

In the first embodiment of the present invention, the increase in the output current in a vicious cycle from I0 to I1' and from I1' to I1'' can be prevented, since the product of the target current TI and the actual voltage AV is set as the command output power CPW. However, in such a case, only the actual power PW1 that is smaller than the requested target power TPW can be extracted from the fuel cell.

In the third embodiment, the actual I-V characteristic which has changed due to insufficient warm-up or deterioration with age is learned and corrected based on the monitored actual voltage AV and actual current AI of the fuel cell, and the target gas operation point is calculated based on the corrected I-V characteristic. The target current TI is obtained from the target power TPW given from the vehicle control system VCS, based on the nominal I-V characteristic in a similar manner to that in the first embodiment. Therefore, for example, the output current is controlled to be I0 as shown in FIG. 10.

The target gas operation point is calculated based on the obtained current I0. When it is learned that the I-V characteristic of the fuel cell has deteriorated with the voltage thereof lowered, the target gas operation point is corrected to increase the gas pressure, whereby the I-V characteristic thereof changes to recover the voltage. In other words, by increasing the gas pressure, the I-V characteristic of the fuel cell comes close to the nominal the I-V characteristic (1) shown in FIG. 10, whereby the output voltage of V0 can be obtained from the fuel cell at the output current I0. Consequently, the command output power CPW calculated as the product of the actual current AI which is equal to I0 and the actual voltage AV which is equal to V0, becomes equal to the desired target power TPW.

There is a limit to the rise in the output voltage of the fuel cell realized by increasing the gas pressure. Therefore, when a large voltage drop in the I-V characteristic of the fuel cell occurs, the configuration according to the second embodiment may preferably be employed together with the configuration of the third embodiment.

As explained above, in the third embodiment, even when the I-V characteristic of the fuel cell changes due to deterioration with age or insufficient warm-up, a vicious cycle of excess current extraction can be prevented, and the output power can be substantially equal to the target power. These effects are obtained in addition to those obtained from the first embodiment.

Further, the actual current AI and the actual voltage AV are monitored during the operation of the fuel cell with data of which are continuously collected. The actual I-V characteristic of the fuel cell is thus learned and corrected based on the collected actual current AI and actual voltage AV, whereby precise and proper system control can be achieved.

Further, the target power TPW is calculated, taking into account the power consumed by the auxiliary equipment associated with the system power generation. The power consumption characteristic of the auxiliary equipment (i.e., the auxiliary equipment consumption data) is also corrected when the I-V characteristic and the PW-I characteristic are corrected through the learning process. Therefore, even when the power consumption of the auxiliary equipment changes due to the correction of the I-V characteristic and the PW-I characteristic, desired target power TPW can be achieved.

A power generation control system 4 according to the fourth embodiment of the present invention will be explained next.

In the fourth embodiment, the I-V characteristic learning unit 103 according to the second and the third embodiments learns and corrects the I-V characteristic using a small amount of data collected during a relatively short period of time such as a warm-up period. Other configurations are similar to those in the second or the third embodiment.

Figure 14:
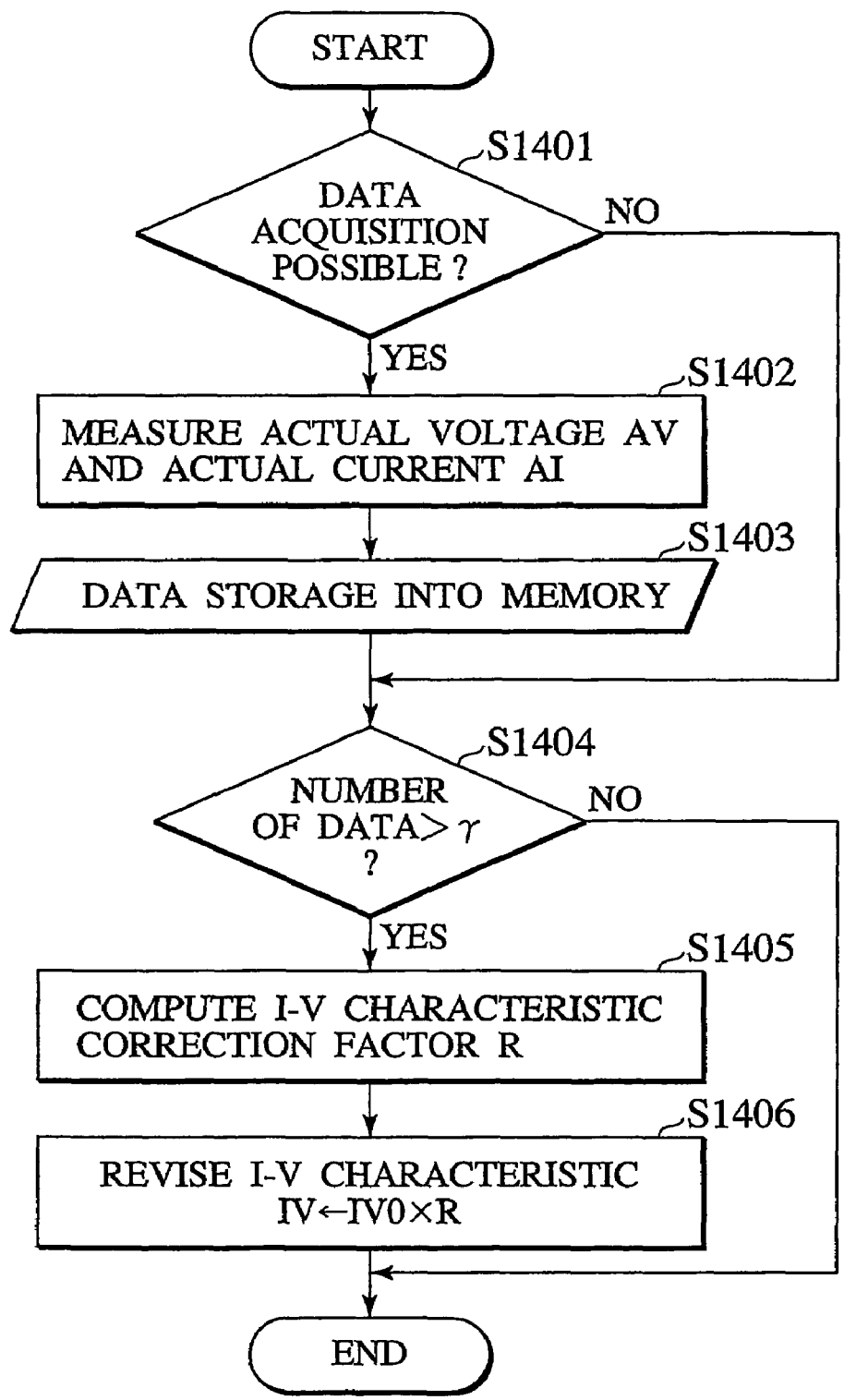
FIG. 14 is a flowchart showing a learning process of the I-V characteristic of the fuel cell according to the fourth embodiment.

A learning process of the I-V characteristic learning unit 103 will be explained with reference to a flowchart shown in FIG. 14. The learning process is executed at every predetermined time, for example, at every 10 ms, similarly to the process shown in the flowchart in FIG. 5.

At step S1401, it is determined whether data of the actual voltage AV and the actual current AI of the fuel cell stack 201 is readable (that is, whether the operation of the fuel cell is not in a transient state where the operational data thereof fluctuate too widely to acquire). When it is determined that the data is readable, the process proceeds to step S1402. When it is determined that the data is not readable, the process proceeds to step S1404. At step S1402, the actual voltage AV and the actual current AI of the fuel cell stack 201 are measured. At step S1403, the values measured at step S1402 are stored into the memory.

At step S1404, it is determined whether the number of data stored in the memory exceeds a predetermined number γ, 10, for example. When the number of data exceeds the predetermined number, the process proceeds to step S1405. When the number of data does not exceed the predetermined number, the learning process ends. At step S1405, an I-V characteristic correction factor R is calculated as follows:

$$R(i)=IV2(i)/IV(i),$$

$$R=\Sigma R(i)/M,$$

wherein i represents an integer from 1 to M, IV2($i$) represents data IV2 at each of M points on the curve of the learned I-V characteristic stored in the memory derived from the collected actual voltages AV and actual currents AI, and IV($i$) represents data IV at each of M points on the curve of the nominal I-V characteristic having the same current values as those of M points of IV2. R(i)s are thus calculated for M points in the I-V characteristic. The correction factor R is then calculated as an average of M R(i)s.

At step S1406, the correction factor R is multiplied by the data IV0 of the reference I-V characteristic equivalent to the nominal I-V characteristic shown in FIG. 3 and FIG. 4, to thereby revise the data IV of the learned I-V characteristic (i.e., IV=IV0×R), then the routine ends.

As explained above, in the fourth embodiment, the I-V characteristic of the fuel cell can be learned in a shorter time than that of the second embodiment, by correcting the basic I-V characteristic based on a small amount of measured actual currents AI and actual voltages AV.

In the second, the third and the fourth embodiments, the I-V characteristic learning unit 103 may learn and correct the I-V characteristic of the fuel cell based on an actual temperature of the fuel cell measured by a temperature sensor or thermometer 217 and a plurality of pieces of I-V characteristic data prepared for various fuel cell temperatures. With this configuration, even when the temperature of the fuel cell changes, the learned I-V characteristic thereof can be more accurate, whereby the control of power generation thereof can be achieved with enhanced precision.

The present disclosure relates to subject matter contained in Japanese Patent Application No. 2002-374433, filed on Dec. 25, 2002, the disclosure of which is expressly incorporated herein by reference in its entirety.

The preferred embodiments described herein are illustrative and not restrictive, and the invention may be practiced or embodied in other ways without departing from the spirit or essential character thereof. The scope of the invention being indicated by the claims, and all variations which come within the meaning of claims are intended to be embraced herein.

INDUSTRIAL APPLICABILITY

In the power generation control system for a fuel cell according to the present invention, the target current computing unit 104 calculates a target current from a target power, which is given by the target power provider 101, based on the power-current characteristic (PW-I characteristic) obtained from the output characteristic (I-V characteristic) of the fuel cell. The command output power computing unit 106 calculates the command output power of the fuel cell based on the target current and the actual voltage of the fuel cell measured by the operation status monitoring system 102. This configuration ensures sufficient output, power of the fuel cell and prevents deterioration thereof, coping with the changing output characteristic thereof.

The invention claimed is:

1. A power generation control system comprising:
   a fuel cell for generating power from fuel gas and oxidant gas fed thereto;
   a target power provider for providing a target power for the fuel cell;
   a detector for detecting output power from the fuel cell, the detector detecting actual output voltage of the fuel cell; and
   a controller comprising
   a target current computing unit which calculates a target current at the target power directly from a nominal power-current characteristic obtained from a nominal output characteristic of the fuel cell, the nominal output characteristic corresponding to a reference output characteristic; and
   a command output power computing unit which calculates a command output power of the fuel cell from the product of the target current and the actual output voltage.

2. The power generation control system according to claim 1, further comprising:
   a gas control system for controlling pressure and flow rate of the respective fuel gas and oxidant gas, wherein the controller further comprises a target gas operation point computing unit which calculates a target gas operation point of the fuel gas and the oxidant gas at the target current based on a gas operation point characteristic which provides pressure and flow rate of the respective fuel gas and oxidant gas for an output current of the fuel cell, and an output characteristic learning unit which learns an actual output characteristic of the fuel cell based on the output power thereof detected by the detector, and corrects the reference output characteristic of the fuel cell based on the learned actual output characteristic thereof, and wherein the gas control system controls the pressure and flow rate of the respective fuel gas and oxidant gas based on the target gas operation point calculated by the target gas operation point computing unit, and wherein the target current computing unit creates a revised power-current characteristic based on the reference output characteristic of the fuel cell corrected by the output characteristic learning unit, and wherein the target current computing unit calculates the target current at the target power based on the revised power-current characteristic.

3. The power generation control system according to claim 1, further comprising:

a gas control system for controlling pressure and flow rate of the respective fuel gas and oxidant gas, wherein the controller further comprises a target gas operation point computing unit which calculates a target gas operation point of the fuel gas and the oxidant gas at the target current based on a gas operation point characteristic which provides pressure and flow rate of the respective fuel gas and oxidant gas for an output current of the fuel cell, and an output characteristic learning unit which learns an actual output characteristic of the fuel cell based on the output power thereof detected by the detector, and corrects the reference output characteristic of the fuel cell based on the learned actual output characteristic thereof, and wherein the gas control system controls the pressure and flow rate of the respective fuel gas and oxidant gas based on the target gas operation point calculated by the target gas operation point computing unit, and wherein the target gas operation point computing unit revises the gas operation point characteristic based on the reference output characteristic of the fuel cell corrected by the output characteristic learning unit.

4. The power generation control system according to claim 2, wherein the detector detects actual output current of the fuel cell in addition to the actual output voltage of the fuel cell, and wherein the output characteristic learning unit learns the actual output characteristic of the fuel cell based on the actual output current and the actual output voltage detected by the detector.

5. The power generation control system according to claim 4, wherein the output characteristic learning unit collects actual output currents and actual output voltages of the fuel cell detected by the detector to correct the reference output characteristic of the fuel cell.

6. The power generation control system according to claim 4, wherein the output characteristic learning unit learns the actual output characteristic of the fuel cell based on the actual output currents and the actual output voltages of the fuel cell detected by the detector during a predetermined period.

7. The power generation control system according to claim 2, further comprising:

a thermometer for measuring an actual temperature of the fuel cell, wherein the output characteristic learning unit has a plurality of pieces of output characteristic data for various temperatures of the fuel cell, and corrects the reference output characteristic based on the measured actual temperatures of the fuel cell.

8. The power generation control system according to claim 2, wherein the target power provider calculates target power by taking into account power consumption of an auxiliary equipment for power generation of the fuel cell, and when the power-current characteristic of the target current computing unit or the gas operation point characteristic of the target gas operation point computing unit are corrected, a current-auxiliary power consumption characteristic, which provides power consumption of the auxiliary equipment for an output current of the fuel cell, are corrected based on the reference output characteristic of the fuel cell corrected by the output characteristic learning unit.

9. A method of controlling power generation of a fuel cell, comprising:

receiving target power for the fuel cell;

detecting an output power from the fuel cell, and detecting an actual output voltage of the fuel cell;

calculating a target current at the target power directly from a nominal power-current characteristic obtained from a nominal output characteristic of the fuel cell; and calculating a command output power for the fuel cell from the product of the target current and the actual output voltage.

10. The method according to claim 9, further comprising:

controlling pressure and flow rate of a fuel gas and an oxidant gas;

calculating a target gas operation point of the fuel gas and the oxidant gas at a target current based on a gas operation point characteristic which provides pressure and flow rate of the respective fuel gas and oxidant gas for an output current of the fuel cell;

learning an actual output characteristic of the fuel cell based on an output power thereof detected by a detector, and correcting a reference output characteristic of the fuel cell based on the learned actual output characteristic thereof;

controlling the pressure and flow rate of the respective fuel gas and oxidant gas based on the target gas operation point calculated in the calculating a target gas operation point step;

creating a revised power-current characteristic based on the reference output characteristic of the fuel cell corrected by the learning an actual output characteristic step; and calculating the target current at a target power based on the revised power-current characteristic.

11. The method according to claim 9, further comprising:

controlling pressure and flow rate of a fuel gas and an oxidant gas;

calculating a target gas operation point of the fuel gas and the oxidant gas at a target current based on a gas operation point characteristic which provides pressure and flow rate of the respective fuel gas and oxidant gas for an output current of the fuel cell;

learning an actual output characteristic of the fuel cell based on an output power thereof detected by a detector, and correcting a reference output characteristic of the fuel cell based on the learned actual output characteristic thereof controlling a pressure and flow rate of the respective fuel gas and oxidant gas based on the target gas operation point calculated in the calculating a target gas operation point step; and revising the gas operation point characteristic based on a reference output characteristic of the fuel cell corrected in the learning step.

12. The method according to claim 10, wherein the detector detects actual output current of the fuel cell in addition to an actual output voltage of the fuel cell, and the learning an actual output characteristic step further comprises learning the actual output characteristic of the fuel cell based on the actual output current and the actual output voltage detected by the detector.

13. The method according to claim 12, wherein the learning an actual output characteristic step further comprises collecting actual output currents and actual output voltages of the fuel cell detected by the detector to correct the reference output characteristic of the fuel cell.

14. The method according to claim 12, wherein the learning an actual output characteristic step further comprises learning the actual output characteristic of the fuel cell based on the actual output currents and the actual output voltages of the fuel cell detected by the detector during a predetermined period.

15. The method according to claim 10, further comprising:

measuring an actual temperature of the fuel cell, wherein the learning an actual output characteristic step further comprises analyzing a plurality of pieces of output characteristic data for various temperatures of the fuel cell, and correcting the reference output characteristic based on the measured actual temperatures of the fuel cell.

16. The method according to claim 10, wherein the step of calculating the target current calculates target power by taking into account power consumption of an auxiliary equipment for power generation of the fuel cell, and when a power-current characteristic or the gas operation point characteristic are corrected, a current-auxiliary power consumption characteristic, which provides power consumption of the auxiliary equipment for an output current of the fuel cell, is corrected based on the reference output characteristic of the fuel cell corrected by the learning an actual output characteristic step.

* * * * *